United States Patent
Liptak et al.

(10) Patent No.: US 10,145,592 B2
(45) Date of Patent: Dec. 4, 2018

(54) BEVERAGE COOLER AND HEATER ASSEMBLY

(71) Applicant: DOMETIC CORPORATION, Louisville, KY (US)

(72) Inventors: William Joseph Liptak, Pompano Beach, FL (US); Charlie Alvin Barefoot, Jr., Dinwiddie, VA (US); Ronald A. Pabisz, Jr., Boynton Beach, FL (US)

(73) Assignee: Dometic Sweden AB, Solna (SE)

( * ) Notice: Subject to any disclaimer, the term of this patent is extended or adjusted under 35 U.S.C. 154(b) by 563 days.

(21) Appl. No.: 14/331,967

(22) Filed: Jul. 15, 2014

(65) Prior Publication Data
US 2016/0018138 A1    Jan. 21, 2016

(51) Int. Cl.
| | |
|---|---|
| *F25B 21/04* | (2006.01) |
| *F16M 11/02* | (2006.01) |
| *A47G 23/02* | (2006.01) |
| *F25D 31/00* | (2006.01) |
| *B60N 3/00* | (2006.01) |
| *B60N 3/10* | (2006.01) |

(52) U.S. Cl.
CPC ............. *F25B 21/04* (2013.01); *B60N 3/00* (2013.01); *B60N 3/104* (2013.01); *F16M 11/02* (2013.01); *F25D 31/007* (2013.01)

(58) Field of Classification Search
CPC .......... B60N 3/103; B60N 3/10; B60N 3/101; B60N 3/107; F25D 31/007–31/008; A47G 23/0208; A47G 23/0216; A47G 23/0225; A47G 2023/0283

USPC .......... 62/3.3, 3.6, 3.64; 220/592.16–592.17; 248/311.2, 312–312.1, 227.2; 224/557, 224/926; 297/188.14
See application file for complete search history.

(56) References Cited

U.S. PATENT DOCUMENTS

| | | |
|---|---|---|
| 3,306,566 A | 2/1967 | Paulson et al. |
| 5,271,244 A | 12/1993 | Staggs |
| (Continued) | | |

FOREIGN PATENT DOCUMENTS

| | | |
|---|---|---|
| CN | 2730684 Y | 10/2005 |
| DE | 202006009975 | 11/2007 |
| (Continued) | | |

OTHER PUBLICATIONS

Eskimo Cup. PRNautica. Taken from http://prnautica.com/uploads/dometic/Eskimo-Specification.pdf. Apr. 10, 2014.*
(Continued)

*Primary Examiner* — Tareq Alosh
(74) *Attorney, Agent, or Firm* — Middleton Reutlinger

(57) ABSTRACT

According to some embodiments, a beverage heating and cooling assembly is provided which includes a collar and beverage retainer assembly for connection to retain the assembly below a mounting substrate. The beverage retainer assembly may include a housing with an active heating or cooling system, such as a thermoelectric engine, which is positioned within or adjacent to the housing and beneath the mounting substrate or similar planar structure. The assembly allows for a clean installation of an active thermal system for beverages in order to keep the beverages cold or warm as desired.

31 Claims, 10 Drawing Sheets

(56) References Cited

U.S. PATENT DOCUMENTS

| | | | |
|---|---|---|---|
| 5,423,508 A * | 6/1995 | Isenga | B60N 3/102 224/407 |
| 5,720,171 A | 2/1998 | Osterhoff et al. | |
| 6,003,724 A | 12/1999 | Collins et al. | |
| 6,449,958 B1 * | 9/2002 | Foye | B60N 3/101 62/3.2 |
| 6,641,101 B2 | 11/2003 | Bergin | |
| 6,644,037 B2 | 11/2003 | Busick et al. | |
| 7,500,443 B1 | 3/2009 | Allen | |
| 7,644,592 B2 | 1/2010 | Kent | |
| 8,104,295 B2 | 1/2012 | Lofy | |
| 8,376,592 B2 | 2/2013 | Engstrom et al. | |
| 8,438,863 B2 | 5/2013 | Lofy | |
| 8,662,581 B1 * | 3/2014 | Behbehani | B60N 3/101 297/188.18 |
| 2006/0022106 A1 | 2/2006 | Mackin | |
| 2008/0095605 A1 | 4/2008 | Omdoll et al. | |
| 2008/0178623 A1 | 7/2008 | Cunningham | |
| 2012/0217772 A1 | 8/2012 | Tang | |
| 2013/0175250 A1 | 7/2013 | Saatkamp et al. | |
| 2013/0239592 A1 | 9/2013 | Lofy | |

FOREIGN PATENT DOCUMENTS

| | | |
|---|---|---|
| DE | 202012004878 | 10/2012 |
| GB | 2480678 | 11/2011 |
| JP | 2000171142 | 6/2000 |
| JP | 2009248869 | 10/2009 |
| WO | 2016011072 | 1/2016 |

OTHER PUBLICATIONS

San Jamar, Euro EZ-Fit Cup Dispenser, Counter Mount; Product Code 094-C2210C18; http://www.katom.com.

Attwood Marine, Recessed Drink Holder, Black, Regular; Part #11787-1; http://www.firstchoicemarine.com.

Seasense, White LED Accent Bezel for Cup Holder; Part #50091070; http://www.firstchoicemarine.com.

International Search Report and Written Opinion of PCT Serial No. PCT/US15/040441, dated Oct. 21, 2015.

Transmittal Letter of Related Cases dated Mar. 9, 2017.

Australian Patent Application No. 2015289762 as filed Jul. 14, 2015 (national stage entry date Jan. 5, 2017).

Chinese Patent Application No. 201580038481.8 as filed Jul. 14, 2015 (national stage entry date Jan. 13, 2017).

European Patent Application No. 15822620.9 as filed Jul. 14, 2015 (national stage entry date Jan. 13, 2017).

U.S. Appl. No. 15/325,861, filed Jan. 12, 2017.

\* cited by examiner

BEVERAGE COOLER AND HEATER ASSEMBLY

STATEMENT REGARDING FEDERALLY SPONSORED RESEARCH

None.

REFERENCE TO SEQUENTIAL LISTING, ETC.

None.

CROSS-REFERENCES TO RELATED APPLICATIONS

None.

BACKGROUND

Field of the Invention

Present embodiments generally relate to a beverage cooling unit for use with a mounting substrate. More particularly, present embodiments relate to, without limitation, a beverage cooling and heating assembly which incorporates a push and twist locking arrangement, as well as an under mount assembly which engages the substrate of a stationary structure, mobile structure, marine vessel or recreational vehicle (RV).

Description of the Related Art

Various devices have been utilized to maintain a temperature of a heated or a cooled beverage container including, but not limited to, a cup, can or bottle in for example, a theater seat or vehicle console or an RV. Many of these structures in the prior art have utilized passive systems which merely insulate the beverage container within a cup holder in order to maintain the existing temperature of the drink stored therein.

More recent devices have utilized active heating or cooling systems with insulation, apply active thermal dynamic action to either remove or add heat to the drink depending on the type of drink the user has. For example, these active systems often position the beverage in front of an HVAC vent to either heat or cool the beverage.

It would be desirable to position a beverage container within an assembly having both heating and cooling capabilities in the area of a mounting substrate, such as for example, a countertop. However, HVAC vents are not generally located in countertops. Therefore, other solutions are needed.

Accordingly, it would be desirable to overcome these and other deficiencies in known cooling systems for beverages and beverage containers. More particularly, it would be desirable to provide such active beverage heating and cooling system in a mounting substrate of a recreational vehicle or a marine craft or alternatively in mobile equipment utilized having long hours of usage such as, for example, farm or construction equipment having flat consoles.

The information included in this Background section of the specification, including any references cited herein and any description or discussion thereof, is included for technical reference purposes only and is not to be regarded subject matter by which the scope of the invention is to be bound.

SUMMARY

According to some embodiments, a beverage heating and cooling assembly is provided which includes a collar and beverage retainer assembly for connection to retain the assembly below a mounting substrate. The beverage retainer assembly may include a housing with an active heating or cooling system, such as a thermoelectric engine, which is positioned within or adjacent to the housing and beneath the mounting substrate. The assembly allows for a clean installation of an active thermal system for beverages in order to keep the beverages cold or warm as desired.

According to some embodiments, a beverage heating and cooling assembly comprises a housing having a first thermal engine compartment and a second drink retaining compartment. A beverage retainer is disposed within the drink retaining compartment and a thermoelectric engine assembly is provided to transfer heat to and from the beverage retainer. A collar engages one of the beverage retainer and a portion of the housing. A plurality of fasteners extend through the housing for engaging an under surface of a mounting substrate. The collar is capable of capturing the mounting substrate on an upper surface and the plurality of fasteners are capable of engaging the under surface of the mounting substrate.

Optionally, the collar may have one of a pin and a track for connecting with the beverage retainer. One of the beverage retainer and the portion of the housing may have the other of the pin and the track for connecting with the collar. The assembly may further comprise a spacer disposed between the housing and the collar. The first engine compartment may be formed at least in part by a cover. The cover may have a plurality of air flow apertures. The thermoelectric engine assembly including a thermal engine. The thermoelectric engine assembly may further include a thermal transfer body engaging the thermal engine. The beverage heating and cooling assembly may further comprise a fan for moving air across the thermal engine assembly. The assembly further comprises the thermal engine in thermodynamic communication with at least one of a thermal transfer body and the beverage retainer. The beverage heating and cooling assembly may further comprise a housing top cover. The plurality of fasteners may pass through the housing top cover. The housing may be engaging the beverage retainer. The beverage retainer may be formed of aluminum. The plurality of fasteners may have caps which engage the under surface. The housing may have channels for passage of the fasteners. The housing may have a housing top cover with an upstanding neck. The neck may have one of a track and a pin. The collar may have the other of the track and the pin. The beverage retainer may have luminaires at an upper end. The collar may have a notch aligned with said luminaires for illumination of the beverage retainer. The collar may further have a trim ring. The assembly may further comprise a pusher disposed within the beverage retainer to force a beverage container toward the thermoelectric engine assembly. The pusher may be formed in the beverage retainer. The pusher may be formed separate of the beverage retainer and connected thereto. Alternatively, the pusher may be formed on an insert which is positioned within the beverage retainer.

According to another embodiment, an active thermal beverage assembly comprises a collar and a beverage retainer assembly including a housing for a beverage retainer and a thermal engine assembly. The collar may engage beverage retainer assembly including a beverage retainer, a housing and a neck wherein a planar structure may be captured between the collar and the beverage retainer assembly. At least one fastener may force the beverage retainer assembly downward and cause frictional engagement between the collar and the beverage retainer assembly, and further pulling the collar downwardly against the planar structure.

According to still a further embodiment, an active thermal beverage assembly comprises a collar having one of at least one of a pin or track which engages a beverage retainer assembly including a neck having the other of at least one pin or track, the beverage retainer assembly includes a housing having a first beverage retainer compartment and a second thermal engine compartment, a thermoelectric engine assembly in thermal communication with a beverage retainer to add or remove heat to the beverage retainer, at least one fastener extends upwardly from said beverage retainer assembly which engages an undersurface of a mounting substrate and pulls the collar downwardly against an upper surface of the mounting substrate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of the beverage cooler and heater assembly will now be described by way of examples. These embodiments are not to limit the scope of the claims as other embodiments of the assembly will become apparent to one having ordinary skill in the art upon reading the instant description. Non-limiting examples of the present embodiments are shown in figures wherein:

DETAILED DESCRIPTION

Figure 1:
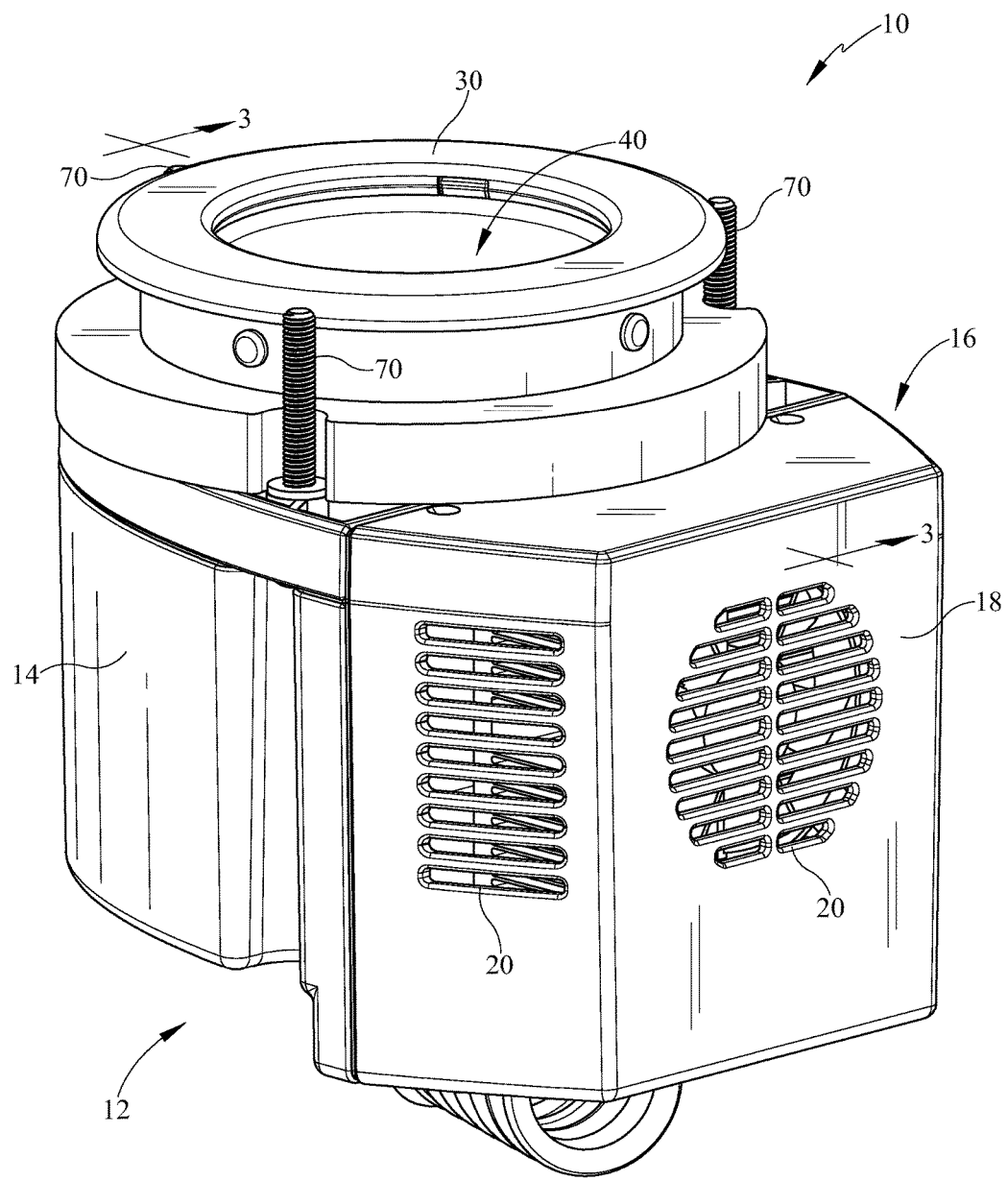
FIG. 1 is an isometric view of an assembled beverage cooler and heater assembly.

It is to be understood that the beverage cooler and heater assembly is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-8, various embodiments of a beverage cooler and heater assembly. The beverage cooler and heater assembly, which may also be referred to as an active thermal beverage assembly, includes a collar assembly and a retainer assembly. The retainer assembly includes a housing which has a compartment for storage of a drink and a second compartment for storage of a cooling engine, for example a thermoelectric engine. The thermal beverage assembly allows for positioning of a collar around and through a hole in a mounting substrate, such as a countertop of a home, RV or marine craft. The assembly allows for stabilizing of the assembly from below the mounting substrate, as well as locking of portions of the assembly above so that the entire assembly captures the mounting substrate therebetween and provides a desirable and clean installation.

Referring now to FIG. 1, an isometric view of an exemplary active thermal beverage assembly 10 is depicted. The assembly 10 may either cool or heat the beverage or be capable of both functions. The active thermal assembly 10 comprises a collar at an upper end and a beverage retainer assembly below the collar. The active thermal beverage assembly 10 may be mounted, in part, under a surface of a mounting substrate, for example a countertop or other planar structure, so that only a hole is seen for placement of the beverage container, such as a cup, can or bottle. The housing 12 may be formed of various materials which have low thermal conductivity. This provides desirable insulative characteristics. Additionally, or alternatively, the housing may have either or both of an insulation within and/or on the exterior of the housing 12. For example, the interior of the housing 12 maybe partially filled with an expanding foam insulation. The active thermal beverage assembly 10 includes a housing 12 which is defined by a first compartment 14 and a second compartment 16. The first compartment 14 provides a location for positioning of the beverage and all the subcomponents that are stored therein for maintaining the beverage in a cold or heated condition. The second compartment 16 provides a location for one or more thermoelectric engine assemblies for either heating or cooling the beverage located in the first compartment 14. Various thermoelectric engine assemblies may be used including, but not limited to, a Peltier cooler described further herein. The second compartment 16 is defined at least in part by a cover 18 which surrounds the thermoelectric engine assemblies therein. The cover 18 may include a plurality of vent holes 20 which pulls ambient air in one location and pushes the air across one or more heat sinks 88 (FIG. 2) within the thermal beverage assembly 10.

Disposed at an upper end of the assembly 10 is a collar or collar assembly 30 which is positioned through an opening in a mounting substrate or other planar structure 38 (FIG. 3), such as a countertop. Beneath the collar 30 is a beverage retainer 40 to which the collar 30 is connected. The retainer 40 is disposed within the housing compartment 14. The collar assembly 30 opens into the beverage retainer 40 for positioning of the beverage container. In this way, a beverage container passes through the collar 30 and into the beverage retainer 40. The beverage retainer 40 may be formed of various materials which have good thermal transfer characteristics. For example, various metallic materials may be used and as one example, aluminum may be utilized. Other materials may be suitable as well.

Figure 3:
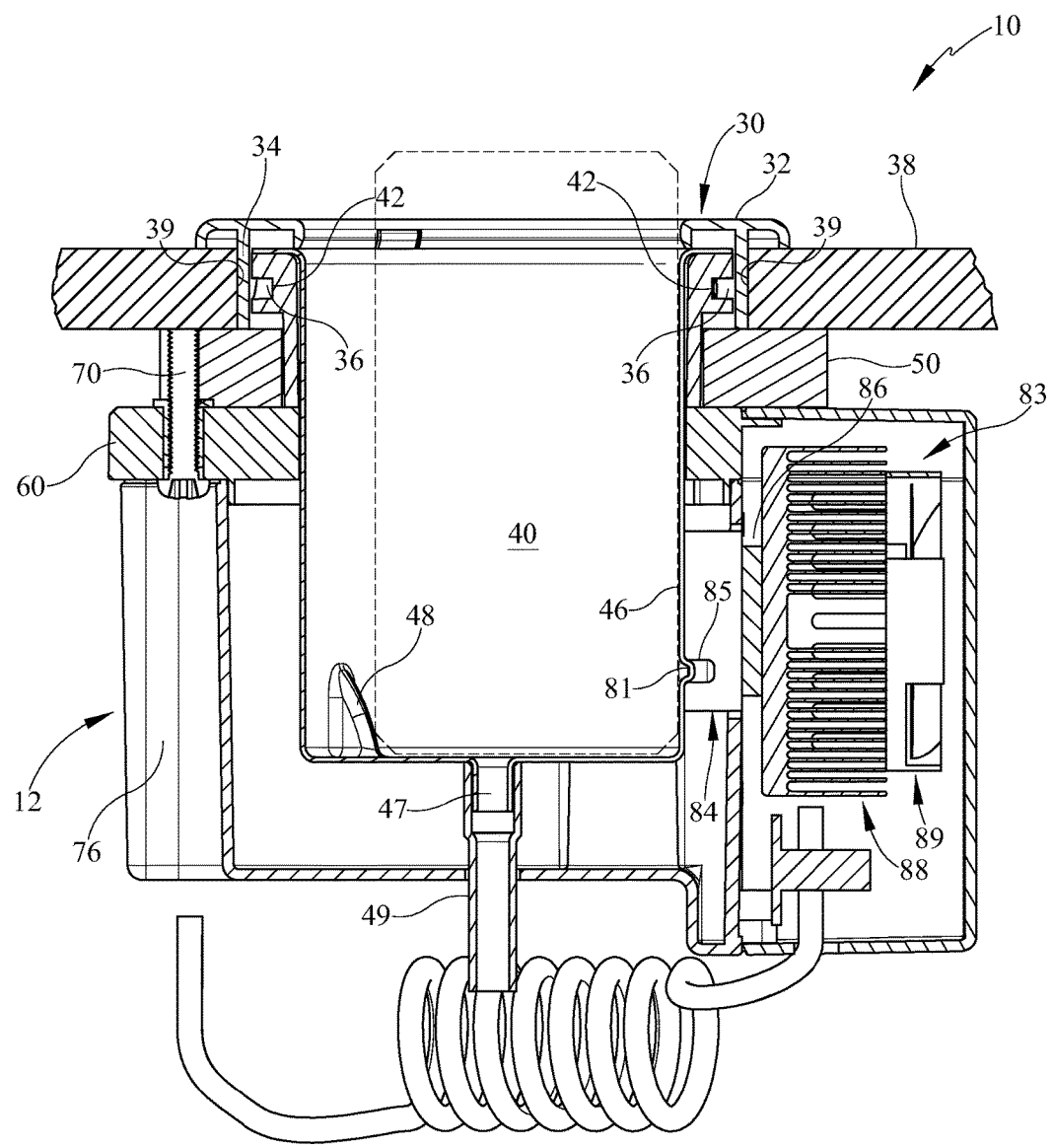
FIG. 3 is a side section view of the assembled beverage cooler and heater assembly.

Extending beneath the housing 12 are a plurality of fasteners 70 which extend upwardly. These fasteners 70 extend through the housing compartment 14 and engage a lower surface of the mounting substrate 38 (FIG. 3). The beverage retainer 40 is connected to the housing 12 and the collar 30 is connected to the beverage retainer 40 in the exemplary embodiment. Accordingly, as the fasteners 70 are tensioned, the collar 30 is pulled downwardly against the upper surface of the mounting structure 38 (FIG. 3) while the housing 12 is pulled against the substrate 38. This tightens the assembly 10 into position capturing the mounting substrate 38 therebetweeen.

Figure 2:
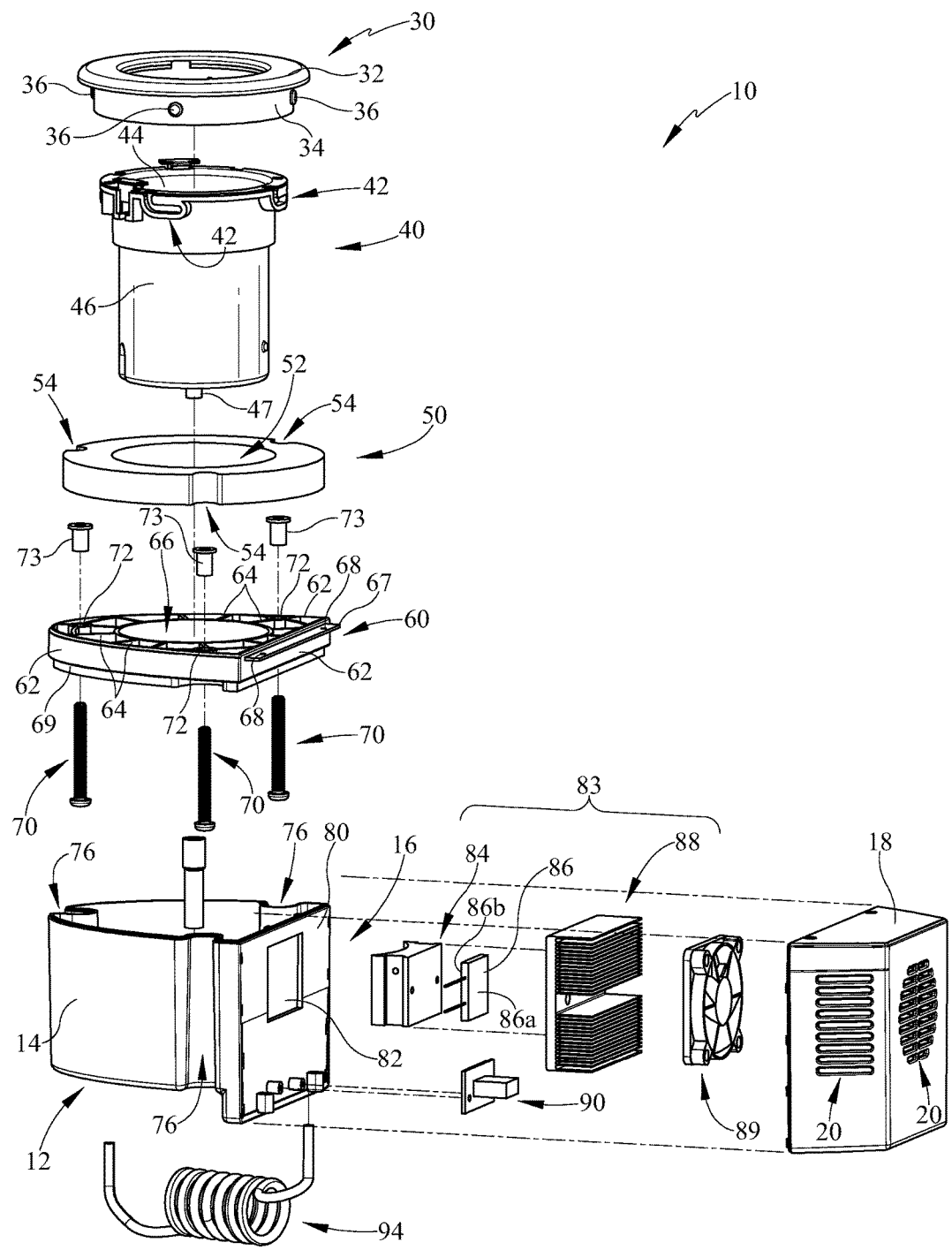
FIG. 2 is an exploded isometric view of a beverage cooler and heater assembly.

Referring now to FIG. 2, the assembly 10 is shown in an exploded isometric view. Beginning at the top of the figure, the collar 30 is shown having an upper ring 32 which is seated on an upper surface of the substrate 38 (FIG. 3) for example, of an RV, marine craft, mobile structure or in a home or other similar static structure. Further, the thermal beverage assembly 10 is suitable for use in other structures such as for example, RV or truck chairs which may have a flat upper console surface in for example an arm rest or other similar structure. The upper ring 32 is oriented horizontally for positioning along the upper horizontal surface of such substrate 38 (FIG. 3). The upper ring 32 may vary in material, color, shape and/or contour in various embodiments. For example, the ring 32 may be formed of plastic or may be plastic and capped with an aesthetically pleasing trim ring 131. Additionally, trim rings may be disposed on the upper ring 32 with various finishes such as chrome, stainless steel, wood finish, carbon fiber or others. Depending from the ring 32 is a substantially vertical flange 34. The flange 34 has a circular cross-section and extends into the mounting substrate 38 (FIG. 3). The flange 34 includes a plurality of pins 36 which engage one or more tracks 42 located on the beverage retainer 40. The pins 36 extend radially inward from the flange 34 but may alternatively extend radially outward depending on the positioning of the flange relative the retainer 40. According to still further embodiments, the pins 36 may be formed integrally, for example molded, with the vertical flange 34 and may extend radially inwardly, so not to be seen from the outer surface in the depicted view, or may extend radially outwardly according to other embodiments. The instant embodiment utilizes pins 36 that extend radially inwardly but as shown in FIG. 2, may be seen on the outer surface. The pins 36 may be press fit through the flange 34, fastened or alternatively may be molded integrally. According to still further embodiments, the pins 36 may be substituted with tracks or threads that engage opposite components for connection with the collar. Still further embodiments may include set screws or other connectors for fastening the parts together. A variety of mechanisms may be used to provide the twist and lock functionality. For example, the collar 30 may be threadably engaged to the beverage retainer 40, the housing 12 or some portion of the housing, such as the housing cover 60.

Beneath the collar 30 is a beverage retainer assembly which may include housing 12 and the beverage retainer 40 within. The housing 12 may be formed in many manners and with various materials. For example, according to one embodiment, the housing 12 may be formed of a plastic by way of a molding process or a thermoforming process. Various materials may have low thermal transfer characteristics so to provide insulative functionality. Also, additional filler insulation may be used so as to insulate the housing 12 and retainer 40 therein. The collar 30 may extend into an opening of the retainer 40 or extend about the outer perimeter of the retainer 40. The beverage retainer 40 is generally circular in shape and has an opening 44 at an upper end which receives a beverage container such as a cup, can, bottle or the like. Tracks 42 are located at various spaced locations about the periphery of the upper end 45 of the beverage retainer 40. The tracks are engaged by pins 36 to define a twist lock bayonet-type connection. Further, the tracks 42 may be on a radial outward surface, radial inward surface, an upper edge of the beverage retainer 40 or a combination thereof. The tracks 42 are located so that pins 36 extend radially inward into the tracks 42 and engage therein. However, if pins 36 extend outwardly, the tracks 42 may be located to receive those in an alternate embodiment. Additionally, the tracks 42 alternatively, may be located on the collar 30 and the pins 36 disposed on the beverage retainer 40 in an opposite configuration. Further, the tracks 42 may take various forms. According to the exemplary embodiment, the track 42 is generally J-shaped such that the collar 30 is pushed downwardly and turns some arcuate distance by way of rotation to connect the collar 30 to the beverage retainer 40. Various track configurations may be utilized or alternatively, threads may be utilized to provide the twist and lock functionality. Such threads may be continuous or discontinuous. Further, other embodiments may be utilized to provide connection between the collar 30 and beverage retainer 40. These features allow for twist and lock of the collar 30 to the beverage retainer 40.

Depending from the upper rim and opening 44 of the retainer 40 is a body 46 which is generally cylindrical in shape and extends upwardly to the upper end of the retainer 40. Alternatively, the shape of body 46 may be something other than cylindrical, such as square, rectangular, or other polygonal shape which can receive a beverage. The body 46 may include at least one drain 47 located near the bottom allowing for condensation to drain from the retainer 40 outwardly from the assembly 10. Additionally, the beverage retainer 40 may include some locking structure which retains the retainer 40 within a housing 12, and according to some embodiments, a first compartment 14 of the housing 12. Alternatively, the retainer 40 may be adhered in place or welded. In further embodiments, the multi-material construction may be formed integrally when molded.

Located beneath the beverage retainer 40 is a spacer or gasket 50. The spacer 50 is circular shaped along an inner perimeter and the outer perimeter but the shape may vary along its outer perimeter. The spacer 50 also includes an aperture 52 through which the beverage retainer 40 may be positioned downwardly therethrough. The spacer 50 further comprises a number of cut-outs 54 through which fasteners 70 may pass.

The spacer 50 is located in the assembly and is positioned against a lower surface of a mounting substrate 38 (FIG. 3). Thus, the collar 30 and beverage retainer 40 are positioned downwardly through the top of the substrate 38 (FIG. 3), and the spacer 50 is positioned against the bottom surface of the substrate 38 (FIG. 3) so that the housing 12 may be seated against the spacer 50. The spacer 50 may further have a sealing function. Still further, the spacer 50 also may function as and be formed of an insulating material having thickness which may vary to accommodate mounting surface thickness. The spacer 50 may also be used to vary height of the aid with fitting against surfaces of differing thicknesses.

According to some embodiments, the spacer or gasket 50 may be formed of EPT (ethylene-propylene terpolymer) foam. The exemplary foam spacer 50 may be a die coat foam sealing material for example comprising an EPDM (ethylene-propylene-diene-methylene) foam and may comprise a closed cell construction. However, alternate materials may be utilized. For example, alternative materials may include, but are not limited to, styrofoam, silicone sealer, fiberglass insulation.

Disposed beneath the spacer 50 is a housing cover 60. The cover 60 may take various shapes which may or may not correspond to the shape of the upper periphery of the housing 12. The housing cover 60 includes a plurality of side walls 62 including a number of strengthening ribs 64 extending inwardly from the side walls 62 to a central opening 66. The ribs 64 may define a plurality of upwardly facing cells as shown. These cells may be filled with insulation if desired. Alternatively, these cells may be facing downwardly. The opening 66 is defined by wall which extends circularly and has a size capable of receiving at least a portion of the beverage retainer body 46. The upper edges of the cover 60 provide a lower seat for the spacer 50 rather than having the cover 60 engage a hard under-surface of a mounting substrate 38 (FIG. 3). The cover 60 also includes a tab 67 including fastening holes 68 for connection of the cover 18 thereto.

Depending from the cover 60 is a housing flange 69 which has a shape corresponding to an upper periphery of the housing 12. The housing flange 69 extends into the housing 12 for connection by various means including, but not limited to, fastening, welding, braising or other known method. Additionally, the cover 60 may be integrally formed with the housing 12 as opposed to being formed separately and fastened, joined or connected afterward.

The cover 60 also includes a plurality of fastening apertures 72 which allow threaded passage of a plurality of fasteners 70 to move through the housing cover 60 toward a mounting substrate 38 (FIG. 3) or surface. The threads may be formed in the cover 60 or threaded inserts 73 may be located in the apertures 72. As the fasteners 70 are tightened by rotation, the upper ends of the fasteners 70 engage the lower surface of the substrate 38 (FIG. 3) and cause the cover 60 and housing 12, i.e. the retainer assembly, to move downwardly away from the collar 30. However, since the collar 30 engages the upper surface of the mounting substrate 38 (FIG. 3), the fasteners 70 are tensioned which tightens the assembly 10 on opposed sides of and against the mounting substrate 38 (FIG. 3).

The housing 12 includes a plurality of channels 76 extending downwardly through the housing 12 which provides a location where the fasteners 70 may be aligned and moved upwardly through the housing cover 60.

Adjacent to the channels 76 is a divider wall 80 having an aperture 82 therein. The aperture 82 allows for positioning of a thermoelectric engine assembly 83. The thermoelectric engine assembly 83 includes a thermal transfer body 84 which is connected to the beverage retainer body 46 and a thermal engine 86. In the instant embodiment, the thermal transfer body 84 provides a thermal path for thermal communication between beverage retainer 40 and a thermal engine 86.

The thermal transfer body 84 is sized to pass through the opening 82 in the divider wall 80 and engage the side wall or body 46 of the beverage retainer 40. This allows heat transfer, either cold or heat, to a beverage located therein. Alternatively, the thermal transfer body 84 may be formed to engage the beverage container through the retainer body 46. One side of the body 84 is curved to increase surface area engagement and maximize thermal transfer.

Adjacent the thermal transfer body 84 is a thermoelectric or thermal engine 86 which according to some embodiments may be a Peltier cooler. The thermoelectric engine 86 is configured to heat or cool the thermal transfer body 84 such that drinks may be stored in a beverage retainer 40 and maintained at a temperature that is cooler or warmer than the ambient condition. The thermoelectric engine 86 is a solid-state active heat pump which transfers heat from one side of the device to the other, with consumption of electrical energy, depending on the direction of the current. Such an instrument is also called a Peltier device, Peltier heat pump, solid state refrigerator, or thermoelectric cooler (TEC). The thermoelectric engine 86 provides thermoelectric effect, that is, the conversion of temperature difference to electric voltage or vice versa. In the instant embodiment, a voltage may be applied to the thermoelectric engine 86 in order to create a temperature differential. The thermoelectric engine 86 has two sides 86a, 86b. In the instant embodiment, a hot side 86a is on the right and a cold side 86b on the left. In general, thermoelectric coolers operate by the Peltier effect (which also goes by the more general name thermoelectric effect). When DC current flows through the device, it brings heat from one side to the other, so that one side gets cooler while the other gets hotter. The hot side 86a is attached to a heat sink 88, which is part of the thermal transfer assembly, so that the hot side 86a remains at or near ambient temperature, while the cool side 86b functions below room temperature, which causes thermal transfer from the thermoelectric cooler 84 to a heat sink 88. It should be appreciated that the hot side 86a and the cold side 80 6B may be reversed for example to provide heat to the beverage in the beverage container 40. In such embodiment, the hot side 86a becomes the cold side in the Cold side 86b becomes the hot side. Thus, one skilled in the art will understand that the labels hot side and cold side are dependent upon the mode of operation of the thermal beverage assembly 10. Disposed on the heat sink 88 is a fan 89 which creates air movement over the heat sink 88 to remove heat from the system through the vent apertures 20 located on the cover 18. Movement of air or other cooling fluid over the heatsink 88 improves convection through the heatsink and therefore improves thermal operation. The fan 89 may include a may include a motor and a fan disk including one or more blades which either push air or other cooling fluid over the heatsink 88 or alternatively pulls air over the heatsink 88.

Beneath the thermal engine 86 is an exemplary circuit board 90. The board may provide control circuitry for operating the thermal engine 86. For example, the engine 86 may include a relay and/or a programmable logic controller. Various control hardware may be found on the circuit board 90.

Optionally, the thermoelectric engine 86 may further comprise a thermal limiter. The limiter may be located on the circuit board 90 for example or alternatively may be located at another location structures so that temperature measurements may be taken. For example a thermal sensor may be located at the heat sink 88 for a high temperature limiter. Oppositely, a low temperature limiter may be located on thermoelectric cooler 84 to keep the beverage from freezing at low ambient temperatures. Also, the lower thermal limiter may also be used to limit on-time of the thermoelectric engine 86 and thereby lower amp hour consumption thus allowing a longer run time. The thermal limiter may be provided with an upper limiter. For example, if the ambient temperature is so high that the maximum cooling cannot cool the beverage to a useful temperature, the limiter may preclude operation of the engine 86. Similarly, the limiter may comprise a lower limiter which limits operation where the assembly 10 is heating beverages and the thermal engine cannot operate to heat the drink to an acceptable temperature due to ambient conditions.

It should further be understood that the thermal engine 86 may be used as a heater. For example, by reversing polarity on the engine 86, the system may be utilized to add heat to the beverage rather than remove heat. Accordingly a circuit may be provided to reverse polarity of the thermal engine 86 to allow reversing of the polarity. Further, a physical switch may be used in the circuit to provide the switching from heating to cooling functionality as desired by a user. Also, for example, a button or indicator to change color of any lighting utilized in the assembly 10, described further herein, may also be provided.

Extending from near the bottom of the second compartment 16 is an electrical cord 94 which provides electrical power to the thermal engine 86 at the end nearest the second compartment 16. At an opposite end of the cord 94, the cord 94 may be connected to a power source, for example a 12V DC source or a 120V AC source, by using a power supply and/or transformer to provide 12 V DC.

Referring now to FIG. 3, a side section view of the beverage cooling assembly 10 is depicted. The collar 30 is seated on and through a mounting substrate 38. A hole 39 is cut into the mounting substrate 38 wherein the collar flange 34 may be positioned and the retainer 40 may extend through. According to this embodiment, the pins 36 extend from the flange 34 radially inwardly to engage the tracks 42 of the beverage retainer 40. In the embodiment depicted, the pins 36 have moved downwardly through the vertical portion of the track 42 and are next rotated toward or near a locked position of the track 42. This connects the collar 30 and the retainer 40. One of the fasteners 70 is shown extending through the cover 60. The fastener 70 moves upwardly through a channel 76 so as to threadably engage the cover 60 and continue through the housing cover 60 to the lower surface of the mounting substrate 38. Once the substrate is engaged, continued rotation of the fastener 70 causes the housing cover 60 and housing 12 to move downwardly. Since the retainer 40 is connected to housing 12, the retainer 40 and collar 30 are pulled down snugging against the substrate 38.

Beneath the substrate 38 is the spacer 50 which is engaged on the lower side by the housing cover 60 and on the upper side by the substrate 38. This provides some cushion and sealing effect between the housing cover 60 and the substrate 38. Additionally, or as an option, the spacer 50 may function as an insulator to aid in maintaining the desired beverage temperature. Additionally, if utilized, the spacer 50 may function to compensate for differing thicknesses of substrate 38.

The side section view also depicts the arrangement of the thermoelectric engine assembly 83 relative to the beverage retainer 40. The engine assembly 83 includes the heat sink 88 and fan 89 which are in thermodynamic communication by way of the thermal transfer body 84 with the thermoelectric engine 86. The thermal transfer body 84 has a rounded surface as better shown in FIG. 2 which corresponds to the curvature of the beverage retainer 40, specifically, body 46. The body 46 includes a protuberance 81 which engages a channel 85 so that the retainer 40 and cooler 84 are retained in connection with one another. These structures may alternatively, or additionally, be bonded or joined together in various fashions so as to improve thermal transfer.

At the bottom of the beverage retainer 40 is the drain 47 which is connected to a tube 49 to allow condensation to be removed from the lower portion of the beverage retainer 40.

In the depicted embodiment, the bolts 70 act on the lower surface of a mounting substrate 38, such as a countertop or other surface. This forces the housing 12, downward as the bolts 70 rotate and pulls the collar 30 downward. The collar 30 however engages the upper surface of the substrate 38 and therefore cannot move downwardly. This creates a friction force between the structures connecting the collar 30 and the beverage retainer 40, tightening the assembly 10.

Figure 4:
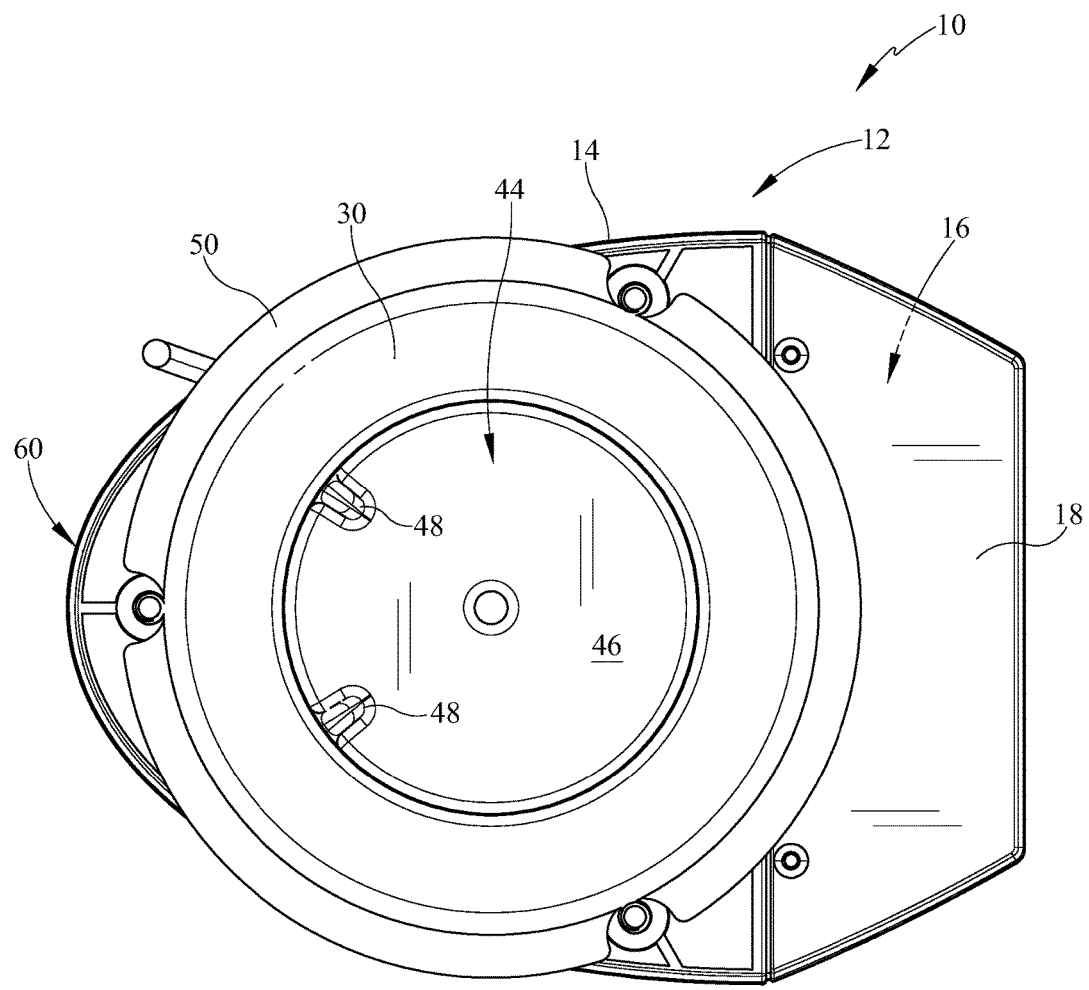
FIG. 4 is a top view of the beverage cooler and heater assembly.

Referring additionally now to FIG. 4, a top view of the assembly 10 is shown. At the upper end of the assembly is the collar 30 disposed above the retainer assembly comprising the housing 12. The first compartment 14 is located beneath the housing cover 16 and the second compartment 16 is shown to the right of the first compartment 14 and partially indicated in broken line since the compartment is inside the engine cover 18.

Through the central opening of the collar 30 is the opening 44 of the beverage retainer body 46. At the bottom of the body, at least one pusher 48 is shown. In the exemplary embodiment, two pushers 48 are shown but this number may vary and is not limiting. The two pushers 48 are angled or tapered from the sidewall of the body 46 to the bottom. In alternative embodiments, the pusher 48 may extend from the sidewall but not engage the bottom or alternatively may extend upwardly from the bottom of the body but not engage the sidewall. As described further herein with reference to FIGS. 7 and 8, still further embodiments may include pushers which are formed separately and inserted into the beverage retainer body 46. According to some embodiment, for example, an insert may be located within the body 46 and formed of a pad or pad like structure and having the pushers formed into the insert. The pad may include a form features which engage corresponding structures in a lower area of the body 46 so that the pad does not rotate undesirably within the body 46. Alternatively, the pusher may be in the form of a pusher structure having push tabs that are disposed through holes in the retainer body 46 and which lock the pusher in place once they are through the body 46. The push tabs would be formed of a resilient compressible materials, such as rubber or a rubber like material that may be compressed and then expends subsequently to its original shape. The holes may be in the side wall of the body 46 or may be in the floor. In either embodiment, the push tabs would extend through the holes, expand and lock the pusher in place on the inside or adjacent to an inner surface of the body 46.

The at least one pusher 48 depicted functions to force or urge a beverage container toward a right hand side of the assembly, in the view depicted in FIG. 4. With reference additionally to FIG. 3, the pusher 48 forces the beverage retainer toward the thermal transfer body 84. This increases thermal communication between the beverage container, shown in broken line in FIG. 3 and the body 84. Additionally, the pusher may be sized to fit between projections on larger bottles, such as 20 ounces beverage bottles. As shown in the embodiment of FIG. 3, the representative beverage container is forced to the right hand side of the body 46 close to the thermal engine assembly 83.

Figure 5:
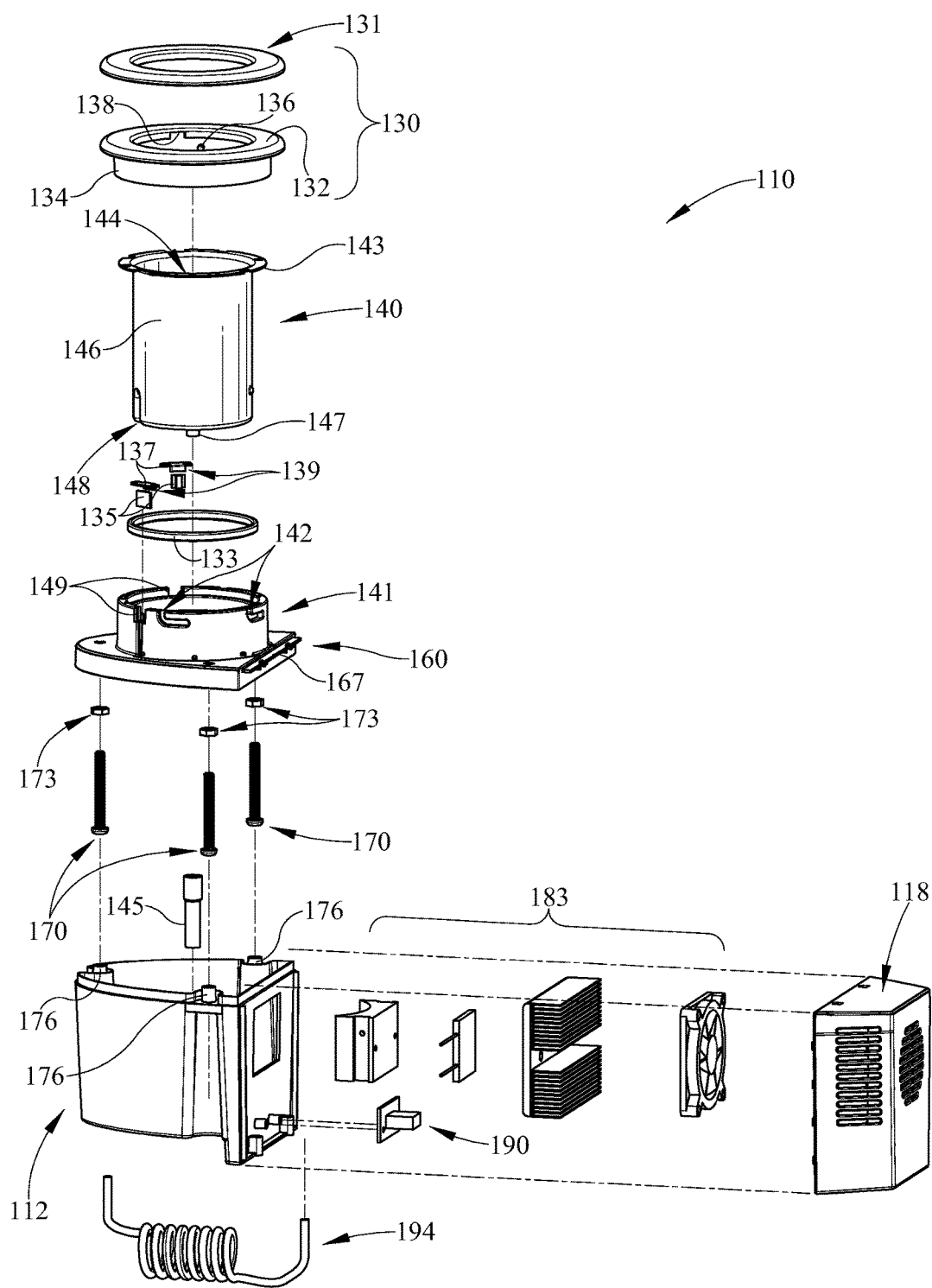
FIG. 5 is an exploded isometric view of an alternate beverage cooler and heater assembly embodiment.

Referring now to FIG. 5, a further alternative embodiment of the coverage cooler and heater assembly 110 is depicted in isometric view. The assembly 110 includes a collar 130 which additionally comprises a trim ring 131 which is positioned on the upper surface of the upper ring 132. The trim ring 131 may be formed of various materials depending upon the countertop surface wherein the assembly 110 is mounted. For example, one desirable material for use as the trim ring 131 may be stainless steel. Other materials may be used, for example, real or faux woods, carbon-printed surface materials having a pattern or a look of a desired material, be it real or faux.

The collar 130 includes an upper ring 132 and a vertical flange 134 depending therefrom. The flange 134 depends downwardly and engages a housing cover 160 including upwardly extending neck 141. In the instant embodiment, the collar 134 includes plurality of radially inwardly extending pins 136 which engage tracks 142 located in the neck 141. Alternatively, collar 130 may be connected to the neck 141 in other fashions, for example set screws may be utilized or alternatively joining devices may be used. As a still further alternative embodiment, the collar 130 and the neck 141 may be formed as a singular part which extends downwardly through the mounting substrate and engages any, all or a combination of the housing top cover 160, the housing 112 or the beverage retainer 140. Still further, the neck 141 may be formed as part of the housing 112 or the housing cover 160 as shown, either of which define the neck as a portion of the housing.

Either or both of the flange 134 and upper ring 132 may also include a light notch 138 which provides for positioning of luminaires, for example LED lights and drivers, or other luminaire to illuminate the assembly 110. For example, it may be desirable to illuminate the opening of the collar assembly 130 so that a user can easily see or to position the beverage when the cabin or other location of use of the assembly 110 is dark. Alternatively, or additionally, it may be desirable to illuminate the interior of a beverage retainer 140. The LED lights may be colored to indicate whether heating or cooling is occurring. For example, if the assembly 110 is in a cooling mode, a blue light may be emitted from the LED light. Alternatively, the LED may comprise a red output when the assembly 110 is in a heating mode. As further options, the LEDs may be other colors, multi-color mode, flashing or patterned output or combinations thereof.

Below the collar assembly 130 is the beverage retainer assembly including beverage retainer 140, the housing 112 and the neck 141. The retainer 140 may include an upper lip 143 which defines an opening 144 of the retainer 140. Additionally, the retainer 140 includes a body 146 which depends downwardly from the lip 143. The beverage retainer 140 is generally cylindrical in shape defined primarily by the body 146 but may be of various alternative geometries. The lip 143 may be seated at or around the upper edge of the neck 141.

At the lower end of the body 146 is at least one beverage pusher 148. The pusher 148 may comprise one or more indentations which extend into the body 146 near the bottom of the retainer 140. These pushers 148 are angled in the interior of the body 146 so that when engaged by a can, bottle, or cup, the pusher forces the beverage container toward the location wherein the thermal electric engine and thermal electric cooler are located. However, the pushers 148 may be sized so as to fit within indentations that are typically found within plastic bottles of beverages, for example 20 ounces beverages bottle. This improves thermal dynamic transfer from the beverage or to the beverage by the components of the cooler assembly 83. According to one embodiment, two beverage pushers 148 are utilized in order to force a beverage toward a thermal cooler assembly 183. However, various numbers of pushers may be used.

Figure 6:
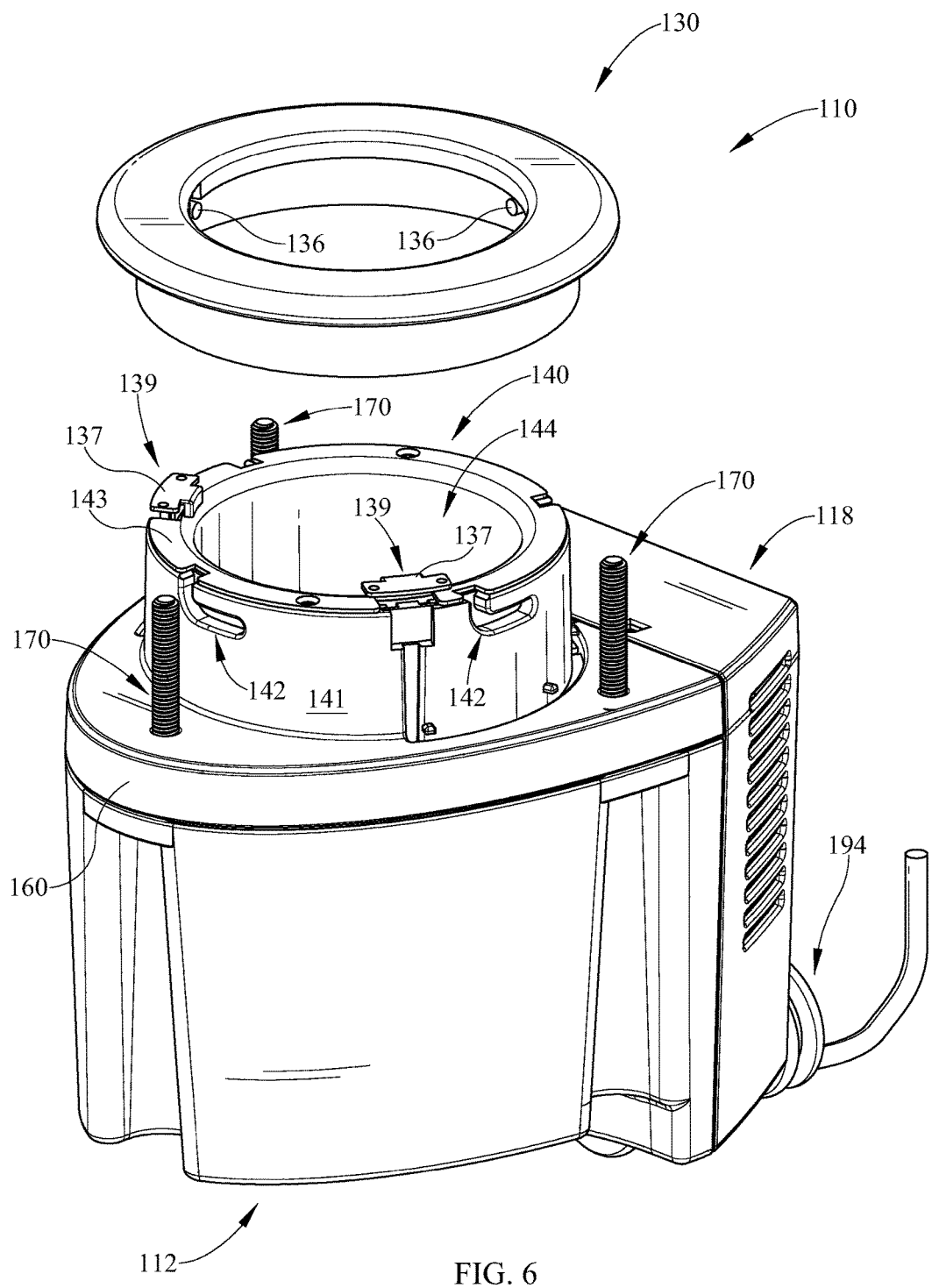
FIG. 6 is a partially assembled isometric view of the alternate embodiment of FIG. 5.

Shown beneath the retainer 140 are LEDs 139 which are pass through notches of the retainer lip 143 and emit light through the light notches 138. These allow for illumination into the opening 144 of the beverage retainer 140 and may be disposed on a printed circuit board or other controller as would be understood by one skilled in the art. Power may be supplied to these features through the housing 12 and upwardly through the neck 141 of the housing cover 160, along the outside surface of the neck 141 or along the inside surface. The neck 141 may also include reliefs 143 for accommodating structures of the LEDs 139. As shown in the figure, the LEDs 139 include a printed circuit board 135 upon which the luminaire may be mounted. The printed circuit board 135 is sized to fit within the notch 149 of the neck 141. A channel may be formed adjacent to the notch 149 to receive power and control wiring for the printed circuit board 135. A lens 137 may be connected to the printed circuit board through which light is dispersed and emitted. The lens 137 may engage the retainer 140 and more specifically, the lens 137 may engage an undersurface of the upper ring 132 of the collar 130. In the instant embodiment, and as shown in FIG. 6, the lens 137 may include locating features, such as holes, which engage pins or other corresponding locating features on the under surface of the ring 132. This locating of the lens 137 relative to the upper ring ensures that when the collar 130 is positioned, the light notch 138 is aligned with the lens 137 allowing emission of light through the collar 130 and into the retainer 140.

As can be seen from this view, the collar assembly 130 is positioned downwardly over the beverage retainer 140. The retainer 140 passes downwardly through the neck 141 and the cover 160 into the housing 112. The pins 136 extend radially inwardly in this embodiment and engage the tracks 142. The assembly 130 is pushed down and rotated about the central axis of the neck 141, beverage retainer 140, and collar assembly 130 to lock the collar 130, relative to the neck 141 and capture the retainer 140 therebetween.

As opposed to the previous embodiment, the neck 141 and housing top cover 160 are joined together. The undersurface of the top cover 60 may be substantially hollow or have support structure such as ribs. The hollow undersurface allows for filling with a foam insulation or other type insulation.

An o-ring or other seal 133 is shown between the retainer 140 and the neck 141. The o-ring 133 inhibits condensation from passing between the retainer 140 and the neck 141. This prevents liquid from moving down the neck 141 damaging the printed circuit board 135 within the neck.

According to other embodiments, the collar flange 134 may be a dual-walled configuration wherein a radially outer wall extends over the neck 141 so as to hide structures from being seen and an inner wall includes pins which extend radially inwardly to engage the tracks 142 or a second wall may be further positioned inwardly so that pins may extend radially outwardly engaging tracks 142 while the outer flange hides tracks and relieves from view.

According to the instant embodiment, the neck 141 may extend upwardly through a mounting substrate or similar surface and may be retained by the engagement collar assembly 130 and more specifically pins 136.

Beneath the neck 141 is the remainder of the housing cover 160. The internal portions of the cover may include a recess or other formed structure to receive nuts 173, for example lock nuts or other locking feature. Beneath the nuts 173 are bolts 170. While these bolts are shown above the housing 112, when constructed, the bolts pass through the housing 112 and upwardly to engage the housing cover 160 and nuts 173 therein. The housing cover 160 also comprises a tab 167 including plurality of fastening apertures for engagement of the cover 118 for the cooler assembly 183. The bolts 170 pass through guides 176 in the housing 112 and through the nuts 173 and housing cover 160 so as to engage the bottom surface of the mounting substrate through which the neck 141 extends. As a further alternative, the housing may have an external flange that is either formed with the housing our connected thereto during manufacturing or installation, such that the bolt os fasteners 170 extend through the flange, rather than directly through the housing as shown. As still a further alternative, an internal flange may be used within the housing 112 so that the fasteners 170 extend through the flange within the housing 112.

A drain tube 145 is positioned through a lower opening in the housing 112. The drain tube 145 extends from and is in fluid communication with a drain 147 at the lower end of the retainer body 146. The arrangement may be provided in other manners but the result is that condensation may be drained from the beverage retainer 140 through the housing 112. Further, the assembly 110 may drain to a location beneath the housing 112 or alternatively may be carried by tubes to alternate locations of the vehicle, boat or structure for removal of the moisture. The remaining portions of the assembly 183 are generally the same as previously described therefore are not reiterated here.

Referring now to FIG. 6, an isometric view of the assembly 110 is depicted wherein the collar assembly 130 is separated from the remainder of the assembly 110. The collar assembly 130 is shown removed from the neck 141 as would be customary during installation. The collar assembly 130 is positioned through a hole in an upper surface of a mounting substrate or other planar surface wherein the assembly 110 is to be mounted. The collar assembly 130 includes the pins 136 extending radially inwardly through a lower portion of the assembly which is positioned through the lower surface opening in a mounting substrate. In this way, the neck 141 extends therethrough to toward the collar assembly 130 extending through the mounting substrate from above. The pins 136 of the collar assembly 130 and the tracks 142 come into engagement and upon engagement with the tracks 142, the collar assembly 130 is rotated which causes the tightening of the lower portion of the assembly 110 toward the collar assembly 130 or alternatively causes the collar assembly 130 to pull downwardly toward the lower portion of the assembly 110. The bolt or fasteners 170 are also shown extending upwardly through the housing cover 160 as previously described nuts may be located along the bottom surface of the housing cover 160 and retained so as to provide threadable engagement with the fasteners 172 alternatively, the housing cover 160 may itself be threaded so as to provide for threadable engagement with the fasteners 170. Once the collar assembly 130 is engaging the track 142, and locked in position the fasteners 170 may be rotated and engage the lower surface of the mounting substrate. This pulls the bottom surface down and causes a tight frictional engagement between the pins 136 and the tracks 142. Specifically, the pins 136 will engage the upper surface of the tracks 142 as the fasteners 170 pull the assembly downward away from the lower surface of the mounting substrate.

The LED assemblies 139 are also shown mounted to retainer lip 143 and extending downwardly into the neck 141. Each LED assembly 139 shines light inwardly into the retainer 140 near the upper most part of the opening 144. Specifically, according to one embodiment, the LED shines light through the openings or notches 138 in the collar assembly 130. As previously described, the LED assembly 139 may output a light color corresponding to the lighting provided. For example, when cooling the output light may be blue for example. Alternatively, when heating the output light may be red. Further output light arrangements may be provided, for example other colors, multi-color or flashing lights or combinations thereof. The power is provided to the unit through the power cord 194 shown at the bottom of the figure to power the engine assembly 83, 183 as previously described.

Figure 7:
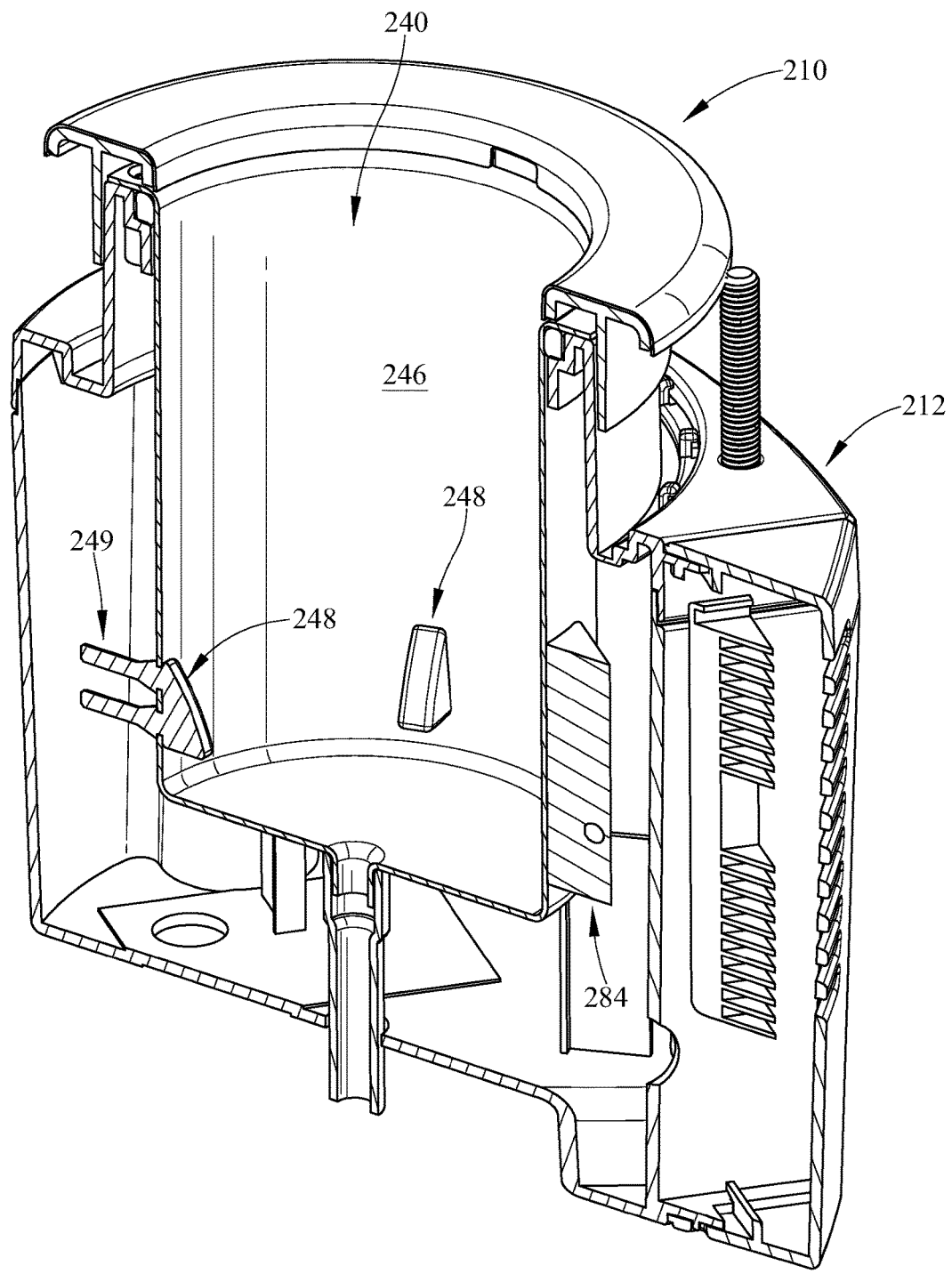
FIG. 7 is a section view of an alternate embodiment of an interior of a beverage cooler and heater embodiment.

Referring out of FIG. 7, a section view of an alternate thermal cup assembly 210 is depicted. The assembly 210 includes a housing to 12 and a beverage retainer 240 therein. A collar 230 is positioned above the housing to 12 and connected to the beverage retainer 240. As previously indicated, the beverage retainer 240 may further include beverage pushers 248 in order to force a beverage retainer toward the thermal transfer body 284. In the instant embodiment, pushers 248 are formed separate from the beverage container 240 and have tabs 249 which extend through holes formed in the beverage retainer 240. The tabs 249 may be formed of a flexible resilient material which maybe depressed to pass through the holes in the body 246 and subsequently expand once through the holes. The pushers 248 may be form of metal, plastic, foam, rubbers or other synthetic materials and/or the like. When a beverage is placed within the beverage retainer 240, the beverage can, bottle or cup engage the pushers 248 as the can, bottle or cup moved into the beverage retainer 240 and moved toward the thermal transfer body 284.

Figure 8:
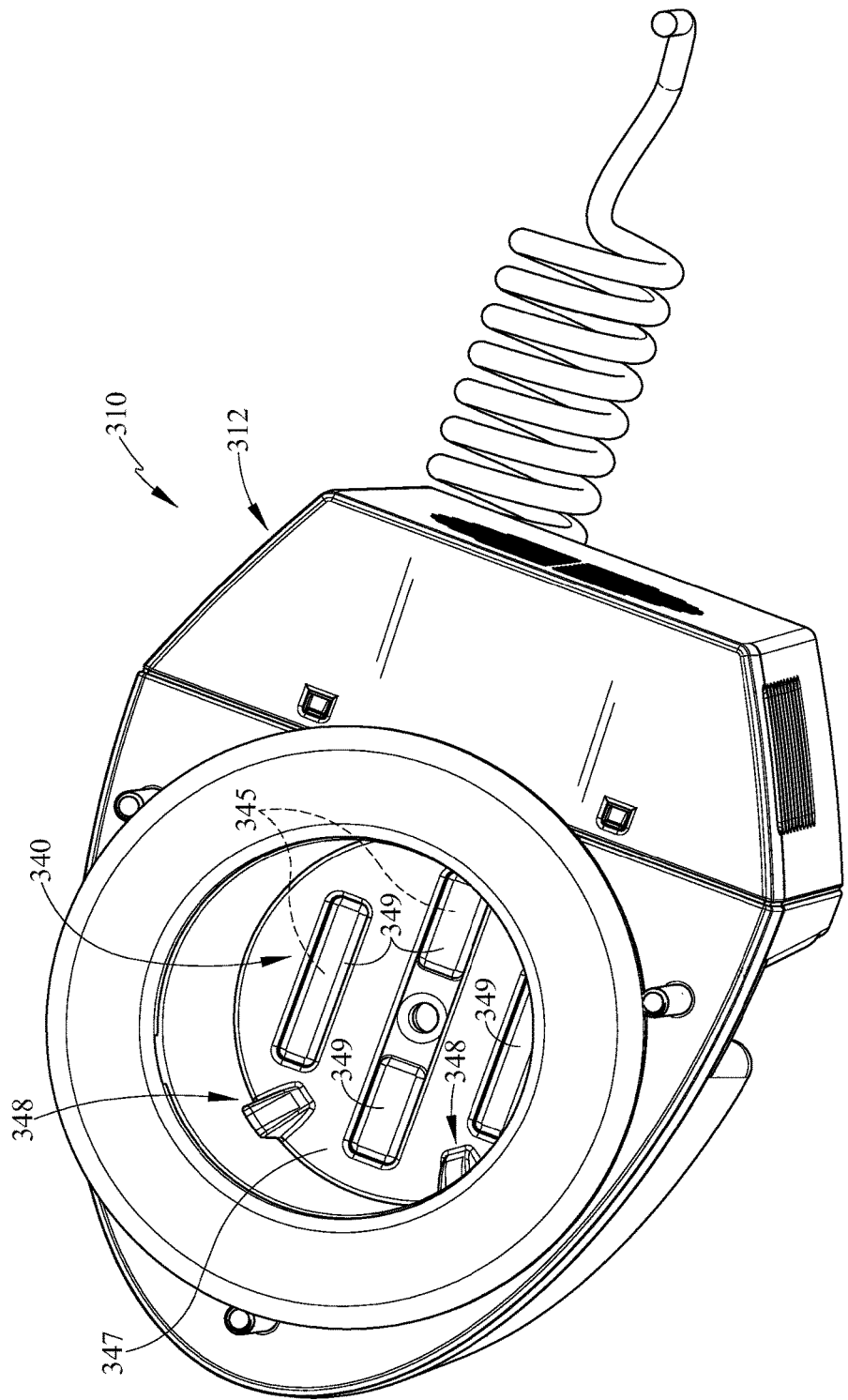
FIG. 8 is an upper isometric view a further alternate embodiment of the beverage cooler and heater assembly embodiment.

Referring now to FIG. 8, an upper perspective view of a further alternative thermal cup assembly 310 is depicted. In this embodiment, an insert 347 is positioned in the lower most portion of the beverage retainer 340. The insert 347 may be formed of various materials such as plastic, rubber, foam, synthetics or the like. The insert 347 further comprises pushers 348 formed integrally therewith. In order to inhibit rotation of the insert 347, the beverage retainer 340 may be formed with a plurality of protuberances 345 shown with broken lead line. Correspondingly, the insert 347 may include forms 349 which are positioned over the protuberances 345 and inhibit rotation of the insert 347 about a vertical axis, extending downwardly through the assembly 310. The bottom of the insert 347 may further comprise an aperture which allows for drainage to condensate in a manner as previously described.

Figure 9:
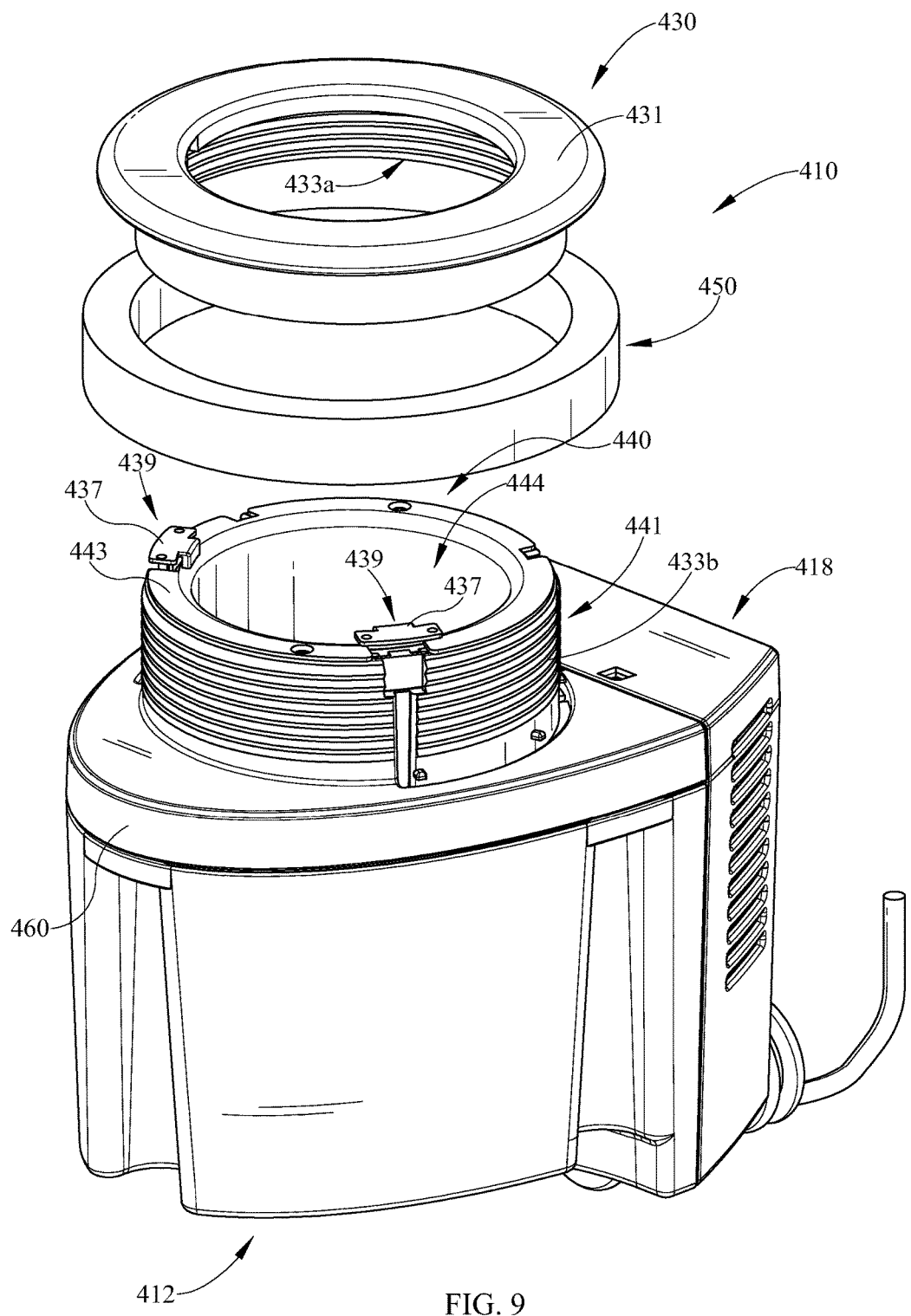
FIG. 9 is a partially exploded perspective view of a further alternative embodiment of the beverage cooler and heater assembly with an alternate connection between the collar and the beverage retainer assembly; and, FIG. 10 is a partially exploded perspective view of a still further alternative embodiment of the beverage cooler and heater assembly with an alternate connection between the collar and beverage retainer assembly.

Referring now to FIG. 9, a perspective view of a further alternative embodiment of cup cooler assembly 410 is depicted. The assembly 410 is similar to previous embodiments and comprises a collar 430 and a beverage retainer assembly including the beverage retainer 440, housing 412 and neck 441 extending from top cover 460. The housing 412 may include a beverage retainer compartment and a thermal engine compartment as previously described. The housing 412 may also include a housing cover 418 covering the portions of the thermal transfer components, as with previous embodiments, ad defining at least a portion of the thermal engine compartment. As also in the previous embodiments, the beverage retainer 440 of the neck 441 may include assemblies for lighting such as LEDs 439 and lenses 437.

Of relevance to the instant embodiment, the collar 430 may include male or female threads 433a located on the vertical depending surface and the neck 441 may have opposed engaging threads 433b. A spacer 450 may be located on the neck 441 so that when the collar 430 is screwed into place, the spacer 450 may compensate for differing thickness of mounting substrate (not shown) and allows the assembly to tighten against the upper and lower surfaces of the substrate. Further, the collar 430 may include a trim ring 431 which may be adhered to the collar 430, if desired to provide various finishes to the upper surface of the collar 430.

Figure 10:
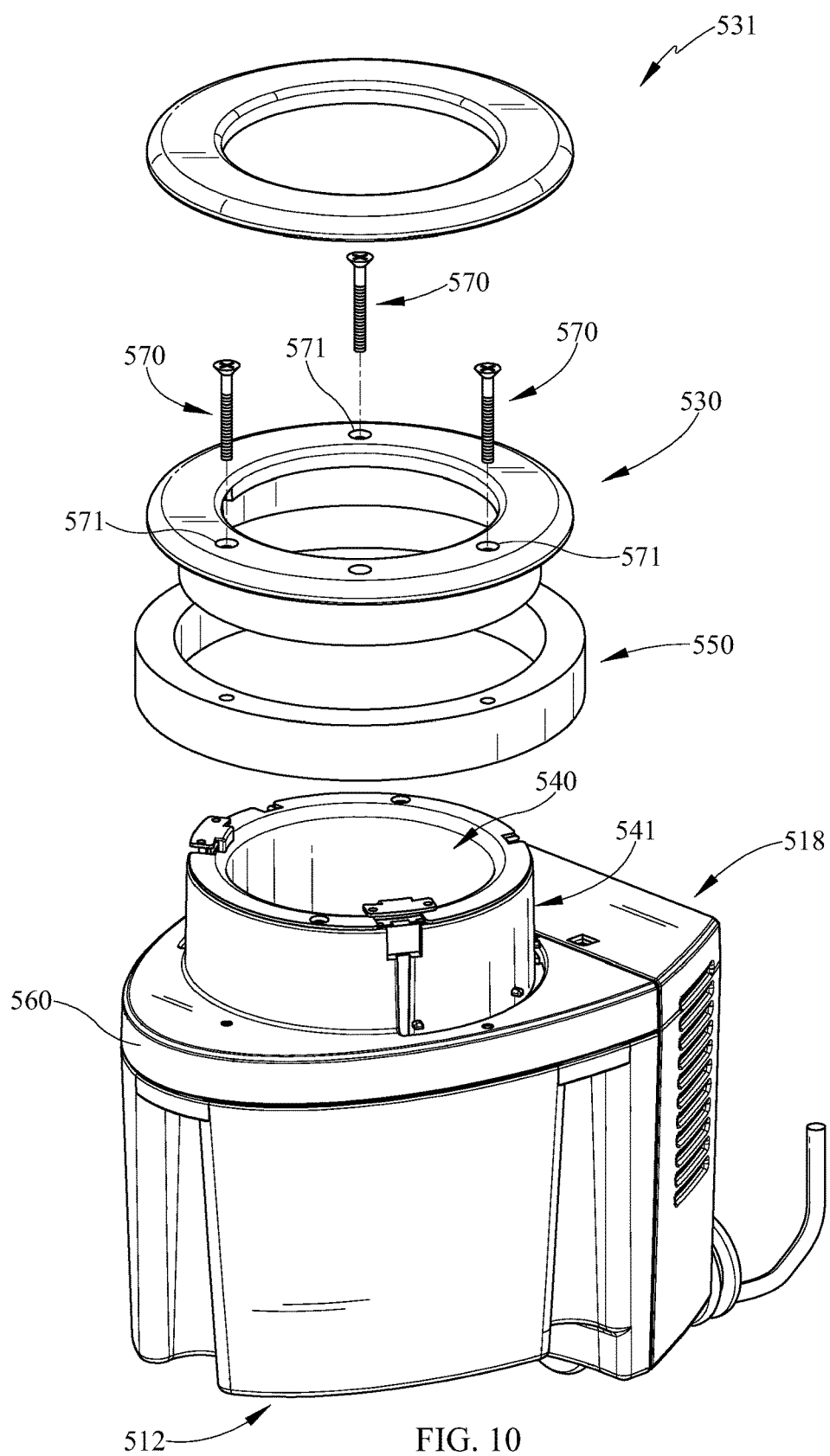

Referring now to FIG. 10, a further embodiment is provided wherein the collar 530 and beverage retainer assembly, including housing 512, beverage retainer 540 and neck 541, are connected by at least one fastener 571. In this embodiment, the at least one fastener 571 extends through the collar 530 and downwardly through the housing 512, and more specifically through the housing top cover 560. As the at least one fastener 571 is tightened, the housing 512 pulls upwardly against the lower surface of the mounting substrate (not shown). In this way, the mounting substrate is clamped or captured between the collar 530 and the housing 512, specifically the top cover 560. A spacer 550 may be located on the housing 512 and used to compensate for varying thicknesses of mounting substrates. The fastener 571 may be a countersunk type of screw so that the fastener top is flush with the collar 530 top surface. Additionally, a trim ring 531 may be positioned on the upper surface of the collar 530 to hide the fasteners, one the structure is assembled and installed.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding,"

"composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A beverage heating and cooling assembly, comprising:
   a housing having a first thermal engine compartment and a second drink retaining compartment;
   a beverage retainer disposed within said drink retaining compartment;
   a thermoelectric engine assembly to transfer heat to and from the beverage retainer, said thermoelectric engine assembly being laterally adjacent to said beverage retainer;
   a collar rotatable to engage one of said beverage retainer or a portion of said housing during installation;
   said beverage retainer and said thermoelectric engine assembly being disposed in said housing;
   said housing being larger than a radially inner dimension of said collar such that a plurality of straight fasteners extending through channels and openings in said housing and from said housing toward said collar are capable of engaging an under surface of a mounting substrate, and wherein said fasteners are spaced outwardly of said collar; and,
   wherein said collar is capable of capturing said mounting substrate on an upper surface and said plurality of fasteners for said engaging said under surface of said mounting substrate.

2. The beverage heating and cooling assembly of claim 1, said collar having one of a pin or a track for connecting with said beverage retainer.

3. The beverage heating and cooling assembly of claim 2, said one of said beverage retainer and said portion of said housing having the other of said pin or said track for connecting with said collar.

4. The beverage heating and cooling assembly of claim 1 further comprising a spacer disposed between said housing and said collar.

5. The beverage heating and cooling assembly of claim 1, said first engine compartment formed at least in part by a cover.

6. The beverage heating and cooling assembly of claim 5, said cover having a plurality of air flow apertures.

7. The beverage heating and cooling assembly of claim 1, said thermoelectric engine assembly including a thermal engine.

8. The beverage heating and cooling assembly of claim 7, said thermoelectric engine assembly including a thermal transfer body engaging said thermal engine.

9. The beverage heating and cooling assembly of claim 1 further comprising a fan for moving air across said thermal engine assembly.

10. The beverage heating and cooling assembly of claim 7 further comprising said thermal engine in thermodynamic communication with at least one of a thermal transfer body and said beverage retainer.

11. The beverage heating and cooling assembly of claim 1 further comprising a housing top cover.

12. The beverage heating and cooling assembly of claim 11, said plurality of fasteners passing through said housing top cover.

13. The beverage heating and cooling assembly of claim 1, said housing engaging said beverage retainer.

14. The beverage heating and cooling assembly of claim 13, said beverage retainer being formed of a metallic material.

15. The beverage heating and cooling assembly of claim 1, said housing having channels for passage of said fasteners.

16. The beverage heating and cooling assembly of claim 1, said housing having a housing top cover with an upstanding neck.

17. The beverage heating and cooling assembly of claim 16, said neck having one of a track or a pin.

18. The beverage heating and cooling assembly of claim 17, said collar having the other of said track or said pin.

19. The beverage heating and cooling assembly of claim 16, said beverage retainer having luminaires at an upper end.

20. The beverage heating and cooling assembly of claim 19, said collar having a notch aligned with said luminaires for illumination of said beverage retainer.

21. The beverage heating and cooling assembly of claim 1, said collar having a trim ring.

22. The beverage heating and cooling assembly of claim 1 further comprising a pusher disposed within said beverage retainer to force a beverage container toward said thermoelectric engine assembly.

23. The beverage heating and cooling assembly of claim 22, said pusher formed in said beverage retainer.

24. The beverage heating and cooling assembly of claim 22, said pusher formed separate of said beverage retainer and connected thereto.

25. The beverage heating and cooling assembly of claim 22, said pusher formed on an insert which is positioned within said beverage retainer.

26. The beverage heating and cooling assembly of claim 1, wherein said collar is threadably engaging said one of a beverage retainer and said portion of said housing.

27. An active thermal beverage assembly, comprising:
    a collar and a beverage retainer assembly;
    said collar twistably engaging said beverage retainer assembly, said beverage retainer assembly including a beverage retainer, a housing and a neck wherein a planar structure may be captured between said collar and said beverage retainer assembly, said housing having a size which is larger than a radially inner dimension of said collar;
    said housing surrounding said beverage retainer and said laterally adjacent thermoelectric engine assembly;
    at least one fastener extending through channels and openings formed in said housing from said housing toward said planar structure and said collar, said at least one fastener capable of engaging said planar structure, forcing said beverage retainer assembly downward and causing frictional engagement between said collar and said beverage retainer assembly, and further pulling said collar downwardly against said planar structure.

28. An active thermal beverage assembly, comprising:
a collar which twists to engage a beverage retainer assembly including, a neck during installation;
said beverage retainer assembly including a housing having a first beverage retainer compartment, a second thermal engine compartment, a beverage retainer, and a said neck, said housing having a size which is larger than a hole in a mounting substrate;
a thermoelectric engine assembly in thermal communication with a beverage retainer to add or remove heat to said beverage retainer;
at least, one fastener extending upwardly through channels and openings formed in said housing, said fasteners capable of engaging an undersurface of said mounting substrate and pulling said collar downwardly against an upper surface of said mounting substrate.

29. The active thermal beverage assembly of claim 28, further comprising a threaded connection between said collar and said beverage retainer assembly.

30. The active thermal beverage assembly of claim 29 further comprising a spacer disposed between said collar and said beverage retainer assembly.

31. The active thermal beverage assembly of claim 28, further comprising a bayonet connection between said collar and said beverage retainer assembly.

* * * * *